United States Patent
Shirlen et al.

(10) Patent No.: US 8,599,886 B2
(45) Date of Patent: Dec. 3, 2013

(54) METHODS AND APPARATUS FOR REDUCING TRANSFER QUALIFIER SIGNALING ON A TWO-CHANNEL BUS

(75) Inventors: Martyn R. Shirlen, Raleigh, NC (US); Richard G. Hofmann, Raleigh, NC (US); Mark M. Schaffer, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 12/868,814

(22) Filed: Aug. 26, 2010

(65) Prior Publication Data

US 2012/0051373 A1    Mar. 1, 2012

(51) Int. Cl.
*H04J 3/12* (2006.01)

(52) U.S. Cl.
USPC ........... 370/524; 370/438; 370/498; 370/522; 710/305; 710/306; 710/307; 711/211

(58) Field of Classification Search
None
See application file for complete search history.

(56) References Cited

U.S. PATENT DOCUMENTS

| | | | | |
|---|---|---|---|---|
| 5,784,582 | A * | 7/1998 | Hughes | 710/117 |
| 5,809,258 | A | 9/1998 | Bemanian et al. | |
| 6,779,098 | B2 * | 8/2004 | Sato et al. | 711/168 |
| 6,889,284 | B1 * | 5/2005 | Nizar et al. | 710/315 |
| 7,610,463 | B2 | 10/2009 | Speier et al. | |
| 2002/0029309 | A1 * | 3/2002 | Lee | 710/240 |
| 2002/0099917 | A1 * | 7/2002 | Sato et al. | 711/168 |
| 2004/0193788 | A1 | 9/2004 | Barth et al. | |
| 2005/0182884 | A1 | 8/2005 | Hofmann et al. | |
| 2007/0028029 | A1 | 2/2007 | Morein et al. | |
| 2007/0204091 | A1 | 8/2007 | Hofmann et al. | |
| 2009/0222598 | A1 | 9/2009 | Hayden | |

FOREIGN PATENT DOCUMENTS

| | | |
|---|---|---|
| WO | WO9819248 A1 | 5/1998 |
| WO | WO0175623 A2 | 10/2001 |

OTHER PUBLICATIONS

International Search Report and Written Opinion—PCT/US2011/049430—ISA/EPO—Nov. 21, 2011.

* cited by examiner

*Primary Examiner* — Donald Mills
(74) *Attorney, Agent, or Firm* — Nicholas J. Pauley; Peter Michael Kamarchik; Joseph Agusta (57) ABSTRACT

To facilitate efficient communications in a multi bus master system that communicates with a plurality of peripheral devices, a two channel bus is used that shares write and read addresses with data on a transmit channel to reduce wiring density and provide efficient, reliable, and high speed data transfers. The two channel bus includes the transmit channel, a receive channel, and a single control channel that provides control information for both the transmit channel and the receive channel further reducing the signaling requirements of the two channel bus. The control information includes a control flag that specifies control information for data transfers on the two channel bus. The control flag and control information may be supplied in two bus cycles or in a single bus cycle depending on the control requirements for two data transfers occurring in parallel on the two channel bus.

9 Claims, 8 Drawing Sheets

| Interface Signals | Read - Write | | | | | |
|---|---|---|---|---|---|---|
| Transmit Channel 414 | ///// | $R_{A1}$ / $W_{A2}$ | $WD0_{A2}$ | $WD1_{A2}$ | $WD2_{A2}$ | $WD3_{A2}$ |
| Read Channel 415 | ///// | ///// | $RD0_{A1}$ | $RD1_{A1}$ | $RD2_{A1}$ | $RD3_{A1}$ |
| OneControl Signals 416 | $C_{A2}$ | $C_{A1}$ | ///// | ///// | ///// | ///// |
| Control Flag 417 | 0010 | 1101 | 0000 | 0000 | 0000 | 0000 |
| Clock 404 | n-1 cycle 405 | n cycle 406 | n+1 cycle 407 | n+2 cycle 408 | n+3 cycle 409 | n+4 cycle 410 |

| | Control Flag | Operation Specification |
|---|---|---|
| 302 | 0000 | Write data phase or no operation (NOP) |
| 303 | 0001 | Control signals in cycle n-1 for address A1 presented in a double transaction cycle n |
| 304 | 0010 | Control signals in cycle n-1 for address A2 presented in a double transaction cycle n |
| 305 | 0011 | Control signals in cycle n-1 for addresses A1 and A2 presented in a double transaction cycle n |
| | 0100 | Reserved |
| | 0101 | Reserved |
| | 0110 | Reserved |
| | 0111 | Reserved |
| | 1000 | Reserved |
| 306 | 1001 | Control signals in cycle n for address A1 presented in a single transaction cycle n |
| 307 | 1010 | Control signals in cycle n for address A2 presented in a single transaction cycle n |
| 308 | 1011 | Control signals in cycle n for addresses A1 and A2 presented in a double transaction cycle n |
| | 1100 | Reserved |
| 309 | 1101 | Control signals in cycle n for address A1 presented in a double transaction cycle n |
| 310 | 1110 | Control signals in cycle n for address A2 presented in a double transaction cycle n |
| | 1111 | Reserved |

METHODS AND APPARATUS FOR REDUCING TRANSFER QUALIFIER SIGNALING ON A TWO-CHANNEL BUS

FIELD OF THE INVENTION

The present invention relates generally to processing systems employing a bus interconnect structure and, more specifically, to techniques for reducing transfer qualifier signaling on a two channel bus.

BACKGROUND OF THE INVENTION

Many portable products, such as cell phones, laptop computers, personal digital assistants (PDAs) or the like, incorporate a processor executing a program supporting communication and multimedia applications. The processing system for such products conventionally includes a number of components that communicate using a bus.

A conventional processing system includes one or more processors, associated memory, and a number of peripheral devices determined by product requirements. Such a processing system may use multiple buses with an individual bus utilized between components according to the data transfer rates expected between the components. For example, one of the individual buses may be a shared bus or a point-to-point bus. A shared bus is connected to multiple components and provides a means for the multiple components to communicate over a common shared channel. A point-to-point bus uses a switching connection between multiple components and provides a switched direct connection path between any two selected components. Multiple direct connection paths may be selected to allow several components to communicate in parallel.

The conventional shared bus and point-to-point bus include separate read data, read address, read control, write data, write address, and write control channels. For example, a processor may write data to a memory or a peripheral by placing a write address value on the write address channel, write data on the write data channel, and controlling write qualifier signaling on the write control channel. The processor may also read data from a memory or peripheral device by placing a read address value on the read address channel, receiving read data on the read data channel, and controlling read qualifier signaling on the read control channel.

Although such bus structures provide a standardized way to communicate between components of the processing system, such bus structures require a large number of interface signals. These interface signals require support circuits, such as drivers, receivers, buffers, and control circuits, all of which consume power. In integrated circuit applications, the wiring and support circuits for these interface signals occupy valuable chip area.

SUMMARY OF THE DISCLOSURE

Among its several aspects, the present invention recognizes a need for a simplified bus structure and the advantage in reducing the number of interface signals to reduce power requirements and to maintain a high rate of communication between components in a processing system. To such ends, an embodiment of the invention applies a method of providing control information on a multi-channel bus. Two address values are issued on a transmit channel of the multi-channel bus for two data transactions occurring in parallel on the multi-channel bus. Control information is indicated for both of the two data transactions on a single control channel that supports time multiplexing of the control information.

Another embodiment of the invention addresses a multi-channel bus. A single transmit channel provides two or more address values for two or more data transactions occurring in parallel on a read channel and the transmit channel. A single control channel supports time multiplexing of control information for each of the two or more data transactions.

Another embodiment of the invention addresses a two channel bus master. A channel data circuit is configured to multiplex addresses and transmit data for transactions on a transmit channel and to receive data for transactions on a receive channel. A transmit control circuit is configured to supply the addresses to the channel data circuit and control information on a single control channel having a control flag to identify the control information with the transactions on the transmit channel and with the transactions on the receive channel.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Computer program code or "program code" for being operated upon or for carrying out operations according to the teachings of the invention may be initially written in a high level programming language such as C, C++, JAVA®, Smalltalk, JavaScript®, Visual Basic®, TSQL, Perl, or in various other programming languages. A program written in one of these languages is compiled to a target processor architecture by converting the high level program code into a native assembler program. Programs for the target processor architecture may also be written directly in the native assembler language. A native assembler program uses instruction mnemonic representations of machine level binary instructions. Program code or computer readable medium as used herein refers to machine language code such as object code whose format is understandable by a processor.

Figure 1:
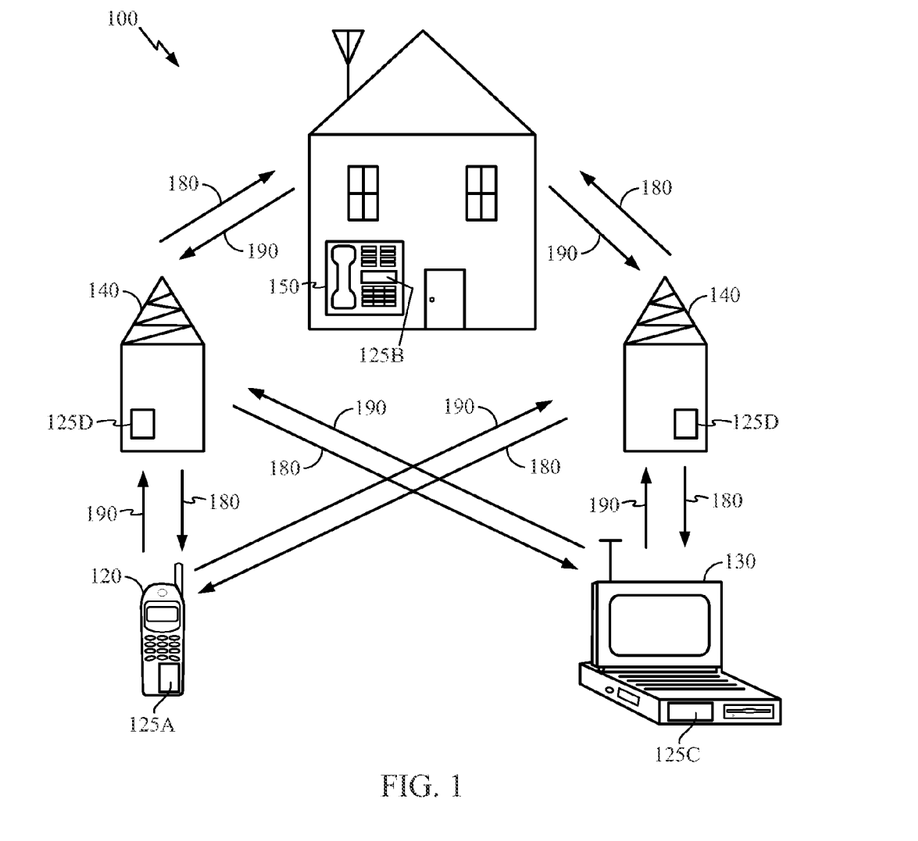
FIG. 1 is a block diagram of an exemplary wireless communication system in which an embodiment of the invention may be advantageously employed.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication system (PCS) units, portable data units such as personal digital assistants, or fixed location data units such as meter reading equipment. Although FIG. 1 illustrates remote units according to the teachings of the disclosure, the disclosure is not limited to these exemplary illustrated units. Embodiments of the invention may be suitably employed in any processor system having a bus for communicating between a processor, memory, and peripheral components.

Figure 2:
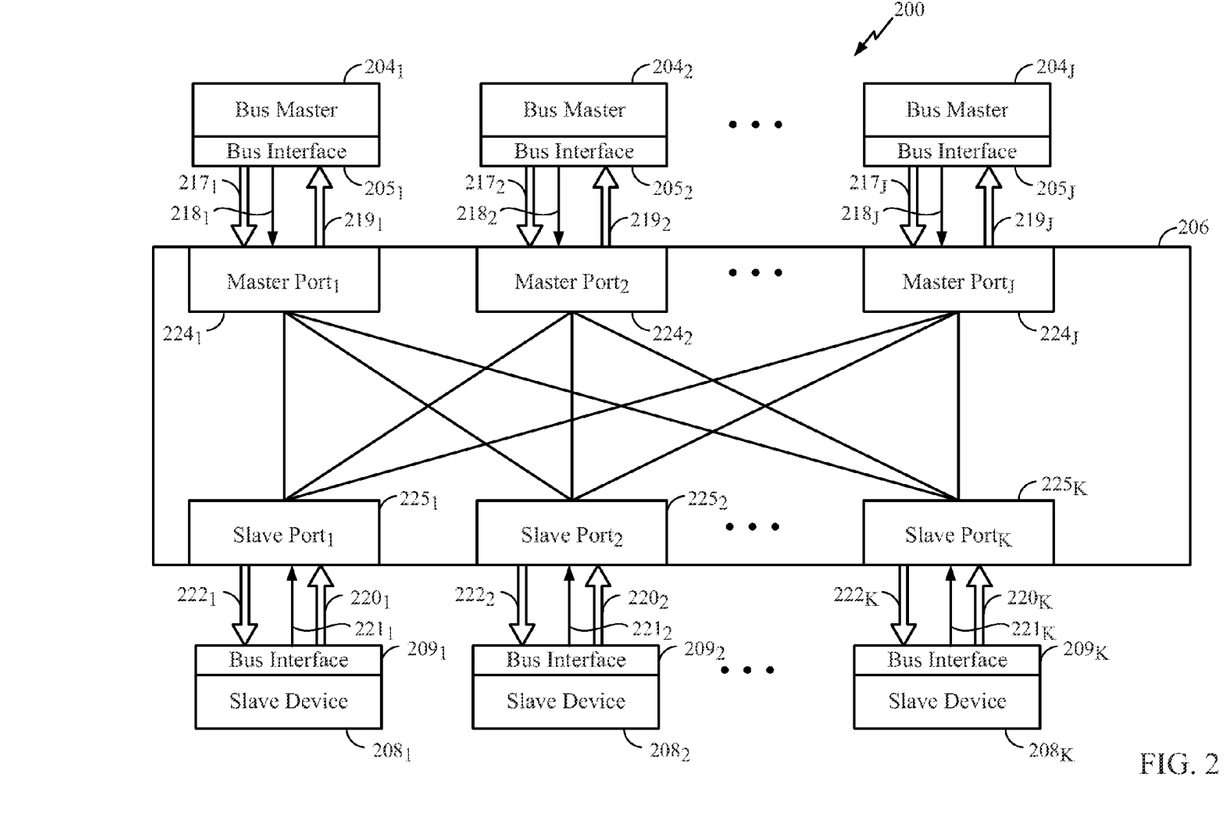
FIG. 2 is a functional block diagram of a processing system having a plurality of bus masters, a switching fabric, and a plurality of slave devices in accordance with the present invention.

FIG. 2 is a functional block diagram of a processing system 200 having a plurality of bus masters $204_1, 204_2, \ldots, 204_J$, a switching fabric 206, and a plurality of slave devices $208_1, 208_2, \ldots, 208_K$ in accordance with the present invention. The bus masters $204_1, 204_2, \ldots, 204_J$ each have bus interface circuits $205_1, 205_2, \ldots, 205_J$, respectively, and the slave devices $208_1, 208_2, \ldots, 208_K$ each have bus interface circuits $209_1, 209_2, \ldots, 209_K$, respectively. The switching fabric 206 includes master ports $224_1, 224_2, \ldots, 224_J$ that are connected to slave ports $225_1, 225_2, \ldots, 225_K$ according to an interconnection strategy, such as a completely connected network.

A two channel bus according to the present invention includes a transmit channel, a read channel, and a single set of control signals, the one control signals. The transmit channel provides the functionality of one or more address buses and a write data bus of a traditional bus architecture. A sending device, such as a bus master, drives addresses on the transmit channel for both a write data operation and a read data operation. Data is received from a source over the read channel. The one control signals provide the functionality of two or more sets of control signals of a traditional bus architecture and may include transfer qualifiers and channel information. A transfer qualifier is a signal that describes an attribute of a read operation, a write operation, or other bus related operation. For example, a signal that indicates the size of a block of data or payload that is sequentially addressed in memory for a read or a write operation is considered a transfer qualifier. The one control signals identify operations on both the transmit channel and the read channel by time multiplexing the transfer qualifiers and thus provides a significant wiring reduction in a system implementation.

With regard to FIG. 2, the bus masters $204_1, 204_2, \ldots, 204_J$ are configured to communicate over two channel buses with the switch fabric 206 using transmit channels $217_1, 217_2, \ldots, 217_J$, one control signals $218_1, 218_2, \ldots, 218_J$, and read channels $219_1, 219_2, \ldots, 219_J$, respectively. The slave devices $208_1, 208_2, \ldots, 208_K$ are configured to communicate over two channel buses with the switch fabric 206 using transmit channels $220_1, 220_2, \ldots, 220_K$, one control signals $221_1, 221_2, \ldots, 221_K$, and read channels $222_1, 222_2, \ldots, 222_K$, respectively. For example, transmit channels $217_1, 217_2, \ldots, 217_J$ and $220_1, 220_2, \ldots, 220_K$ and read channels $219_1, 219_2, \ldots, 219_J$ and $222_1, 222_2, \ldots, 222_K$ are 64-bit wide buses. A memory system may be designed to support the processing system 200 operations that require 32-bit addresses. Thus, two 32-bit addresses may be presented on any of the 64-bit wide transmit channels during a single clock cycle.

A bus master, such as one of the bus masters $204_1, 204_2, \ldots, 204_J$, may be a processor, such as a general purpose processor, a digital signal processor (DSP), or a multi-core processor having a plurality of processors, a direct memory access (DMA) controller, an application specific circuit, a programmable logic circuit, or the like. For example, a processor acting as a bus master $204_2$ employs the associated bus interface $205_2$ to drive the transmit channel $217_2$ and appropriate control signals $218_2$. The bus interface $205_2$ also receives data communicated on the read channel $219_2$.

A slave device, such as one of the slave devices $208_1, 208_2, \ldots, 208_K$, may be any device capable of retrieving and storing information. For example, a storage device acting as slave device $208_2$ employs the associated bus interface $209_2$ to drive the transmit channel $220_2$ and appropriate control signals $221_2$. The bus interface $209_2$ also receives data communicated on the read channel $222_2$. The storage device may be an integrated memory device, an external memory device, or a combination of both that stores data and software used in processing system 200 operations.

In a typical implementation, a control bus for a read channel or for a write channel requires approximately twenty wires, or approximately forty wires for implementations having a separate read control channel and a separate write control channel. Using the present invention, the one control signals may use approximately twenty wires and the control flag an additional four wires or a total of twenty four wires. Thus, there is a sixteen wire savings per bus interface in accordance with the present invention. With reference to FIG. 2, with J master ports $224_1, 224_2, \ldots, 224_J$ that are connected to K slave ports $225_1, 225_2, \ldots, 225_K$, there are J*K two channel buses providing a savings of J*K*16 wires without considering the considerable wiring reduction in the switching fabric 206. For example, in what might be considered a relatively small system with J=K=10, there is a possible savings of 1,600 wires without considering the switching fabric. A significant savings even in a relatively small system.

Figure 3:
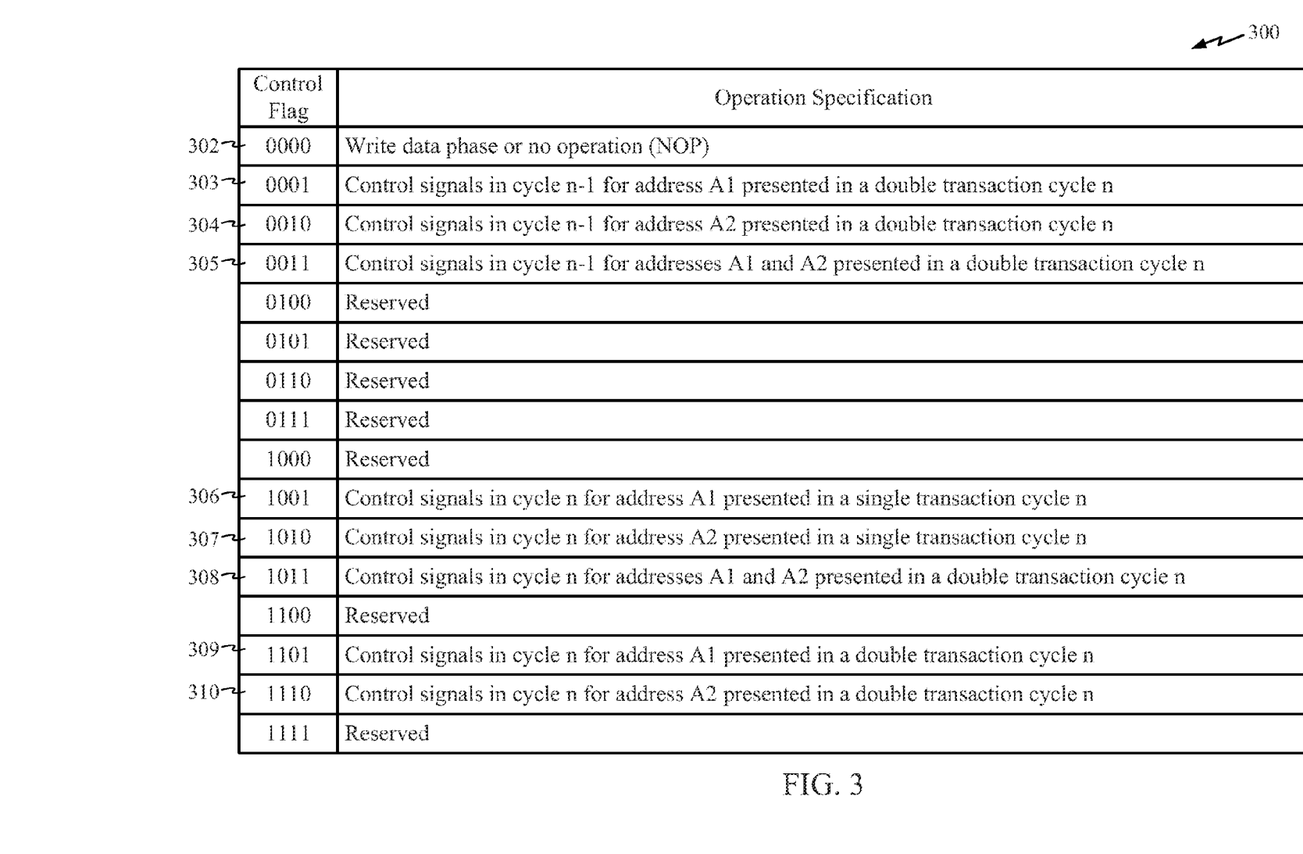
FIG. 3 is a transfer qualifier signaling list for a two channel bus in accordance with the present invention.

FIG. 3 is a transfer qualifier signaling list 300 for a two channel bus in accordance with the present invention. Instead of having a first set of control signals for a transmit channel and a second set of control signals for a read channel, an embodiment of the present invention uses a single set of control signals, the one control signals, having a control flag to identify operations on both the transmit and read channels. The transfer qualifier signaling list 300 includes control flag values and associated operation specifications 302-310. In one aspect, a control flag value 302 identifies a write data phase or a no operation (NOP) phase when no address information is presented on the transmit channel and no control information is presented on the one control signals. In another aspect, a control flag value 303 identifies control information in a clock period (cycle) "n–1" for a new address A1 that is presented in a double transaction cycle "n" on the two channel bus. In another aspect, a control flag value 304 identifies control information in a clock cycle "n–1" for a new address A2 that is presented in a double transaction cycle "n" on the two channel bus. In another aspect, a control flag value 305 identifies control information in a clock cycle "n–1" for two new addresses A1 and A2 that are presented in a double transaction cycle "n" on the two channel bus when each transfer has the same control information. In a another aspect, a control flag value 306 identifies control information in cycle "n" for a new address A1 that is presented in the same cycle "n" for a single transfer on the two channel bus. In a another aspect, a control flag value 307 identifies control information in cycle "n" for a new address A2 that is presented in the same cycle "n" for a single transfer on the two channel bus. In another aspect, a control flag value 308 identifies control information in cycle "n" for two new addresses A1 and A2 that are presented in the same cycle "n" on the two channel bus for two transfers when each transfer has the same control information. In another aspect, a control flag value 309 identifies control information in the same cycle "n" for a new address A1 that is presented in cycle "n" for two transfers on the two channel bus. In a further aspect, a control flag value 310 identifies control information in the same cycle "n" for a new address A2 that is presented in cycle "n" for two transfers on the two channel bus. While the transfer qualifier signaling list 300 is shown with binary coded decimal (BCD) encoding, those skilled in the art will realize that a different encoding could be chosen without changing the intent of this invention.

Figure 4A:
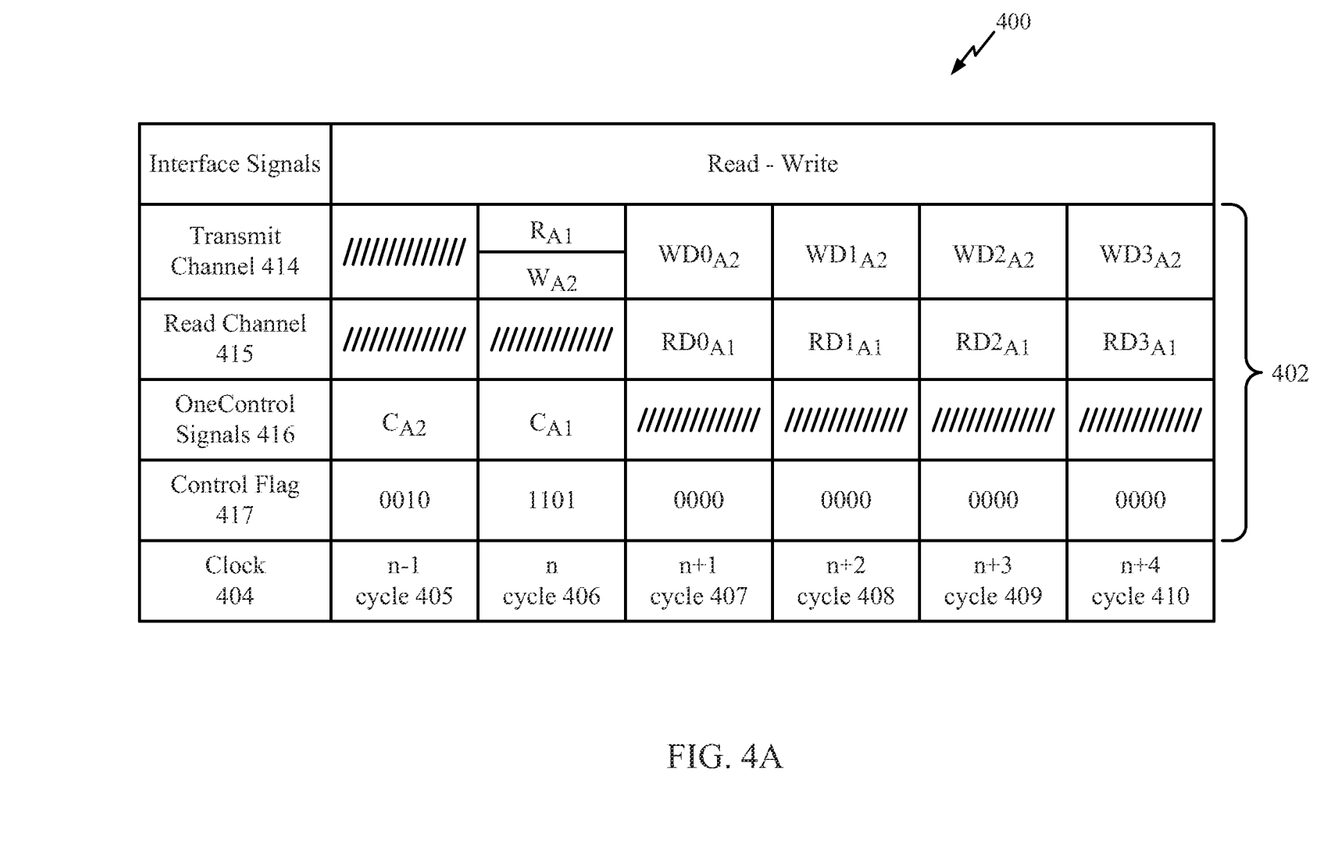
FIG. 4A is a timing diagram showing read and write operations between a bus master and a slave device over a two channel bus in accordance with the present invention.

FIG. 4A is a timing diagram 400 showing read and write operations between a bus master, such as bus master $204_2$ of FIG. 2, and a slave device, such as slave device $208_K$ of FIG. 2, over a two channel bus 402 in accordance with the present invention. A clock 404, is shown to indicate timing relationships between the signals on the two channel bus 402. The clock 404 is divided into cycles 405-410. The two channel bus 402 comprises a transmit channel 414, a read channel 415, and one control signals 416 including a control flag 417 shown separate from the one control signals 416. The control flag 417 issues the appropriate control flag as illustrated in FIG. 3. The transmit channel 414 and the read channel 415 may both be 64-bit buses, for example. An exemplary packet size transfer qualifier of four 64-bit data packets is applied for both of the read and write operations as one of the signal qualifiers applied on the one control signals 416. Also, it is assumed in the following example, that internal transmit and receive buffers or as appropriate first in first out (FIFO) buffers are not at full capacity to allow data streaming of the four 64-bit packets on the illustrated two channel bus.

The "n–1" cycle 405 is either a write data phase for a previous operation or a no operation (NOP) phase as indicated by the slashed lines on the transmit channel 414 in the "n–1" cycle 405. For such a cycle, a control flag value of "0000" is generally used. However, a control flag value of "0010" may be used that indicates control information is active on the one control signals 416. For example, control information "0010" for the write address $W_{A2}$ is presented in the "n–1" cycle 405, while the write address $W_{A2}$ is presented in the "n" cycle 406. Also, control information "1101" for the read address $R_{A1}$ and the read address $R_{A1}$ is presented in the "n" cycle 406. Thus, control information for both of the read and write operations, where both operations require different control information, may be issued on the one control signals 416.

The read and write operations on the two channel bus of FIG. 4A begin with a bus master, such as the bus master $204_2$, issuing control information $C_{A2}$ on the one control signals 416 and a value of "0010" on the control flag 417 in the "n–1" cycle 405. The control flag value "0010" indicates that the control signals are presented in the "n–1" cycle 405 are for the address A2 presented in the "n" cycle 406. The address A2 is associated with the write operation, such as a 32-bit write address, and is illustrated as a write address A2 ($W_{A2}$) on the transmit channel 414 in the "n" cycle 406.

In the "n" cycle 406, the bus master $204_2$ issues control information $C_{A1}$ on the one control signals 416 and a value of "1101" on the control flag 417. The control flag value "1101" indicates that the control signals presented in the "n" cycle 406 are for the address A1 also presented in the "n" cycle 406. The address A1 is associated with the read operation, such as a 32-bit read address, and is illustrated as a read address A1 ($R_{A1}$) on the transmit channel 414 in the "n" cycle 406. Thus, in the "n" cycle 406 both a 32-bit read address $R_{A1}$ and a 32-bit write address $W_{A2}$ are presented on the transmit channel 414.

Beginning in "n+1" cycle 407 and continuing through "n+4" cycle 410 the four 64-bit read data packets and the four 64-bit write data packets are streamed across the two channel bus. During these transfers, the control flag 417 is set to a value "0000" indicating no control information is active on the one control signals 416. Since the initial control information $C_{A2}$ was overlapped with a previous bus operation in the "n–1" cycle 405, no delay affected the performance of the two channel bus even though both of the read and write operations required different control information be supplied on the one control signals 416. Although two cycles are required to transmit the required control information for two transfers with differing control attributes, one of the two cycles is hidden by overlapping it with a previous cycle having a no operation (NOP) or write data phase. It can be appreciated that the control information is not multiplexed onto the transmit channel since to do so would require additional transmit channel cycles and impact system performance of the many transmit and receive bus operations for each bus master and slave device.

Figure 4B:
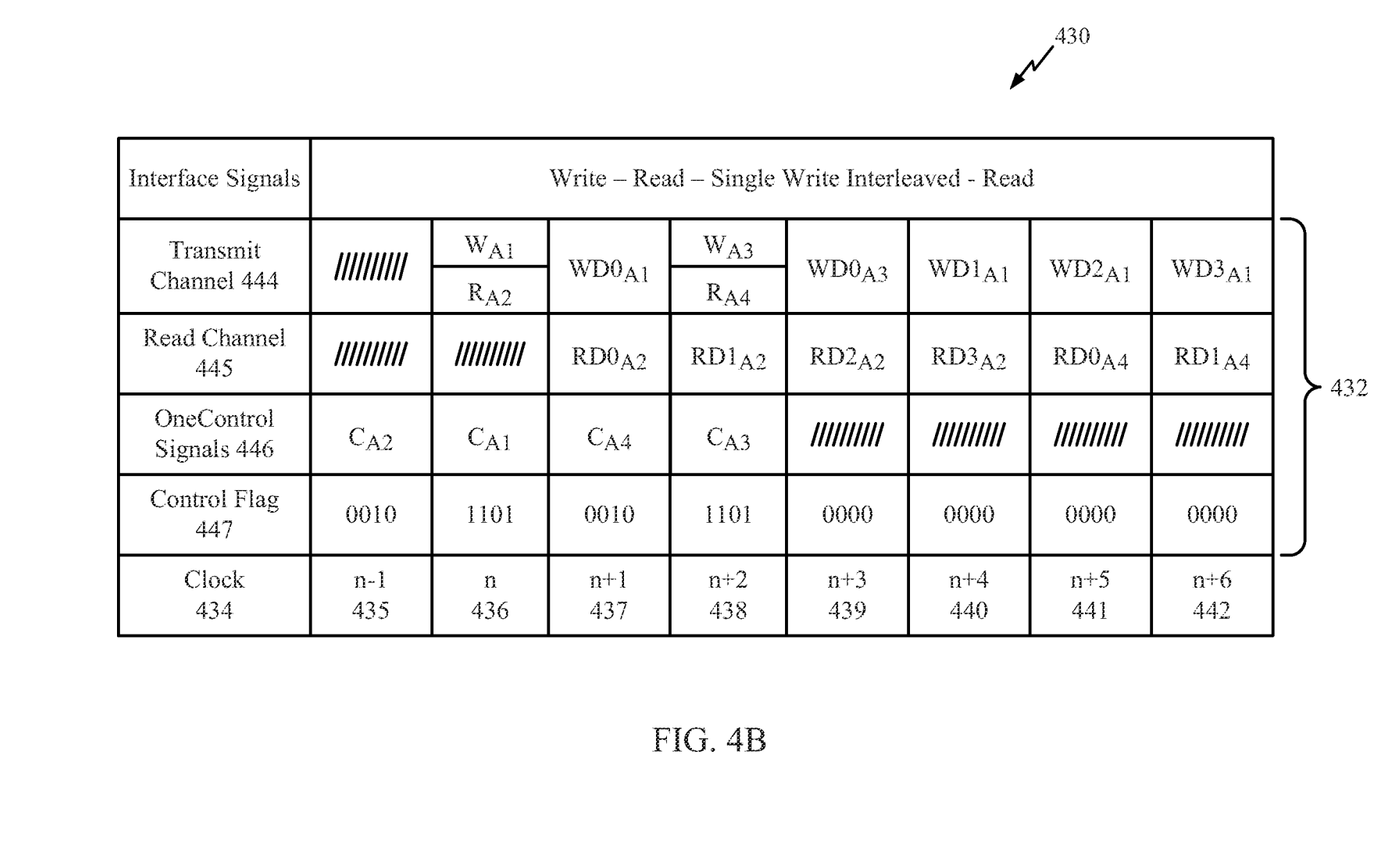
FIG. 4B is a timing diagram showing write and read operations interleaved with a single write operation between a bus master and a slave device over a two channel bus in accordance with the present invention.

FIG. 4B is a timing diagram 430 showing write and read operations interleaved with a single write packet operation between a bus master and a slave device over a two channel bus 432 in accordance with the present invention. The clock 434 is divided into cycles 435-442. The two channel bus 432 comprises a transmit channel 444, a read channel 445, and a one control signals 446 including a control flag 447 shown separate from the one control signals 446. For example, the transmit channel 444 and the read channel 445 may both be 64-bit buses. Also, an exemplary packet size transfer qualifier of four 64-bit data packets is applied for both of the read and write operations as one of the signal qualifiers applied on the one control signals 446. Also, it is assumed that transmit and receive buffers are not at full capacity to allow data streaming of the four 64-bit packets and the single interleaved write packet on the illustrated two channel bus.

Prior to the four packet write operation completing, a high priority write is interleaved on the transmit channel, after which the transmit channel completes the initial four packet write operation. While a read address may be delegated to the upper portion of the transmit channel as indicated in the read and write operations shown in timing diagram 400 of FIG. 4A, it is not a requirement of this invention. The timing diagram 430 of FIG. 4B illustrates a case where the read address is on the lower portion of the transmit channel.

The "n−1" cycle 435 is either a write data phase for a previous operation or a no operation (NOP) phase as indicated by the slashed lines on the transmit channel 444 in the "n−1" cycle 435. For such a cycle, a control flag value of "0000" is generally used. However, a control flag value of "0010" indicates control information is active on the one control signals. Thus, control information for both of the read and write operations, where both operations require different control information, may be issued on the one control signals 446 in the "n−1" cycle 435.

The read and write operations on the two channel bus of FIG. 4B begin with a bus master, such as the bus master $204_2$, issuing control information $C_{A2}$ on the one control signals 446 and a value of "0010" on the control flag 447 in the "n−1" cycle 435. The control flag value "0010" indicates that the control signals presented in the "n−1" cycle 435 are for the address A2 presented in the "n" cycle 436. The address A2 is associated with the read operation, such as a 32-bit read address, and is illustrated as a read address A2 ($R_{A2}$) on the transmit channel 444 in the "n" cycle 436.

In the "n" cycle 436, the bus master $204_2$ issues control information $C_{A1}$ on the one control signals 446 and a value of "1101" on the control flag 447. The control flag value "1101" indicates that the control signals presented in the "n" cycle 436 are for the address A1 also presented in the "n" cycle 436 for two accesses. The address A1 is associated with the write operation, such as a 32-bit write address, and is illustrated as a write address A1 ($W_{A1}$) on the transmit channel 444 in the "n" cycle 436. Thus, in the "n" cycle 436 both a 32-bit read address $R_{A2}$ and a 32-bit write address $W_{A1}$ are presented on the transmit channel 444.

At "n+1" cycle 437, a first 64-bit write data packet $WD0_{A1}$ is transferred across the transmit channel 444. A pending single write operation and a pending read burst operation cause the bus master $204_2$ to issue control information $C_{A4}$ on the one control signals 446 and a value of "0010" on the control flag 447. The control flag value "0010" indicates that the control signals presented in the "n+1" cycle 437 are for the address A4 presented in the "n+2" cycle 438. The address A4 is associated with the read operation, such as a 32-bit read address, and is illustrated as a read address A4 ($R_{A4}$) on the transmit channel 444 in the "n+2" cycle 438. Also, beginning in "n+1" cycle 437 and continuing through "n+4" cycle 440 the four 64-bit read data packets are streamed across the read channel 445.

In the "n+2" cycle 438, the bus master $204_2$ issues control information $C_{A3}$ on the one control signals 446 and a value of "1101" on the control flag 447. The control flag value "1101" indicates that the control signals presented in the "n+2" cycle 438 are for the write address A3 also presented in the "n+2" cycle 438. The address A4 is associated with the read operation, such as a 32-bit read address, and is illustrated as a read address A4 ($R_{A4}$) on the transmit channel 444 in the "n+2" cycle 438. Thus, in the "n+2" cycle 438 both a 32-bit read address $R_{A4}$ and a 32-bit write address $W_{A3}$ are presented on the transmit channel 444.

At "n+3" cycle 439, the interleaved single 64-bit write data packet $WD0_{A3}$ is transferred across the transmit channel 444. The read channel 445 continues with the four 64-bit read data packet transfer, without interference from the interleaved write operation. During the "n+3" cycle 439 to the "n+6" cycle 442, the control flag 447 is set to a value "0000" indicating no control information is active on the one control signals 446.

At "n+4" cycle 440, a second 64-bit write data packet $WD1_{A1}$ is transferred across the transmit channel 444. The read channel 445 completes the four 64-bit read data packet transfer, without interference from the interleaved write operation.

At "n+5" cycle 441, a third 64-bit write data packet $WD2_{A1}$ is transferred across the transmit channel 444. The first 64-bit read data packet $RD0_{A4}$ associated with the read address A4 is transferred across the read channel 445.

At "n+6" cycle 442, a fourth and final 64-bit write data packet $WD3_{A1}$ is transferred across the transmit channel 444.

Since the initial control information $C_{A2}$ was overlapped with a previous bus operation in the "n−1" cycle 435, no delay affected the performance of the two channel bus even though both of the read and write operations required different control information be supplied on the single one control signals 446. Although two cycles are required to transmit the required control information for two transfers with differing control attributes, one of the two cycles is hidden by overlapping it with a previous cycle having a no operation (NOP) or write data phase.

Figure 4C:
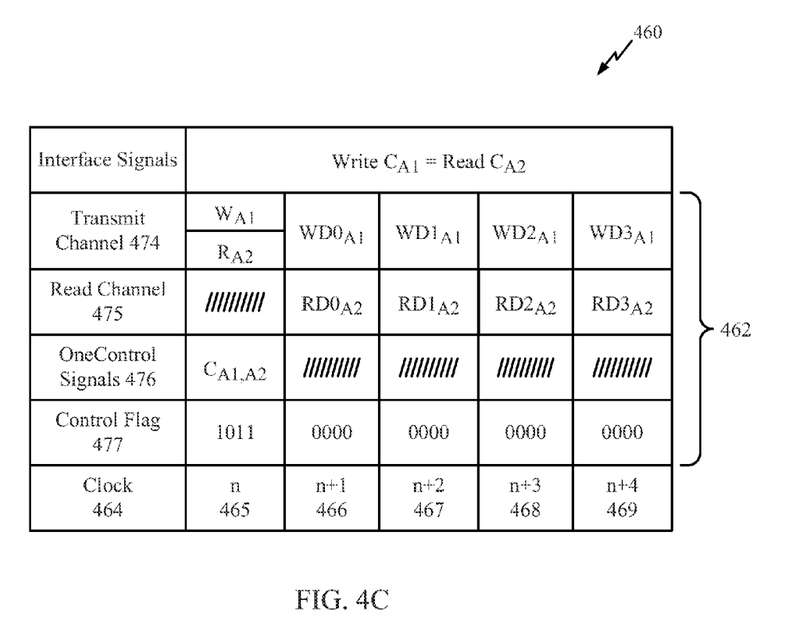
FIG. 4C is a timing diagram showing write and read operations between a bus master and a slave device over a two channel bus when each transfer has the same control information in accordance with the present invention.

FIG. 4C is a timing diagram 460 showing write and read operations between a bus master and a slave device over a two channel bus 462 when each transfer has the same control information in accordance with the present invention. The clock 464 is divided into cycles 465-469. The two channel bus 462 comprises a transmit channel 474, a read channel 475, and a one control signals 476 including a control flag 477 shown separate from the one control signals 476. For example, the transmit channel 474 and the read channel 475 may both be 64-bit buses. Also, an exemplary packet size transfer qualifier of four 64-bit data packets is applied for both of the read and write operations as one of the signal qualifiers applied on the one control signals 476. Also, it is assumed that transmit and receive buffers are not at full capacity to allow data streaming of the four 64-bit packets and the single interleaved write packet on the illustrated two channel bus.

The read and write operations on the two channel bus of FIG. 4C begin with a bus master, such as the bus master $204_2$, issuing control information $C_{A1}$ and $C_{A2}$ ($C_{A1,A2}$), when each transfer has the same control information, on the one control signals 476 and a value of "1011" on the control flag 477 in the "n" cycle 465. The control flag value "1011" indicates that the control signals are presented in the "n" cycle 465 are for both transactions having the addresses A1 and A2 also presented in the "n" cycle 465. The address A1, such as a 32-bit address, is associated with the write operation and is illustrated as a write address A1 ($W_{A1}$) on the transmit channel 474 in the "n" cycle 465. The address A2, such as a 32-bit address, is associated with the read operation and is illustrated as read address $R_{A2}$ on the transmit channel 474 in the "n" cycle 465. Thus, control information for both of the read and write operations, where both operations require the same control information, control information $C_{A1}$ is equal to control information $C_{A2}$, may be issued on the one control signals in the same cycle.

The cycles "n+1" 466 through "n+4" 469 complete the four packet transfers for both the read channel and the transmit channel. The shared control bus, one control signals 476, in accordance with the present invention exploits spatial and temporal locality of reference for single cycle double pended transactions where the probability of control information for each of the pending transactions being the same is high.

Figure 5:
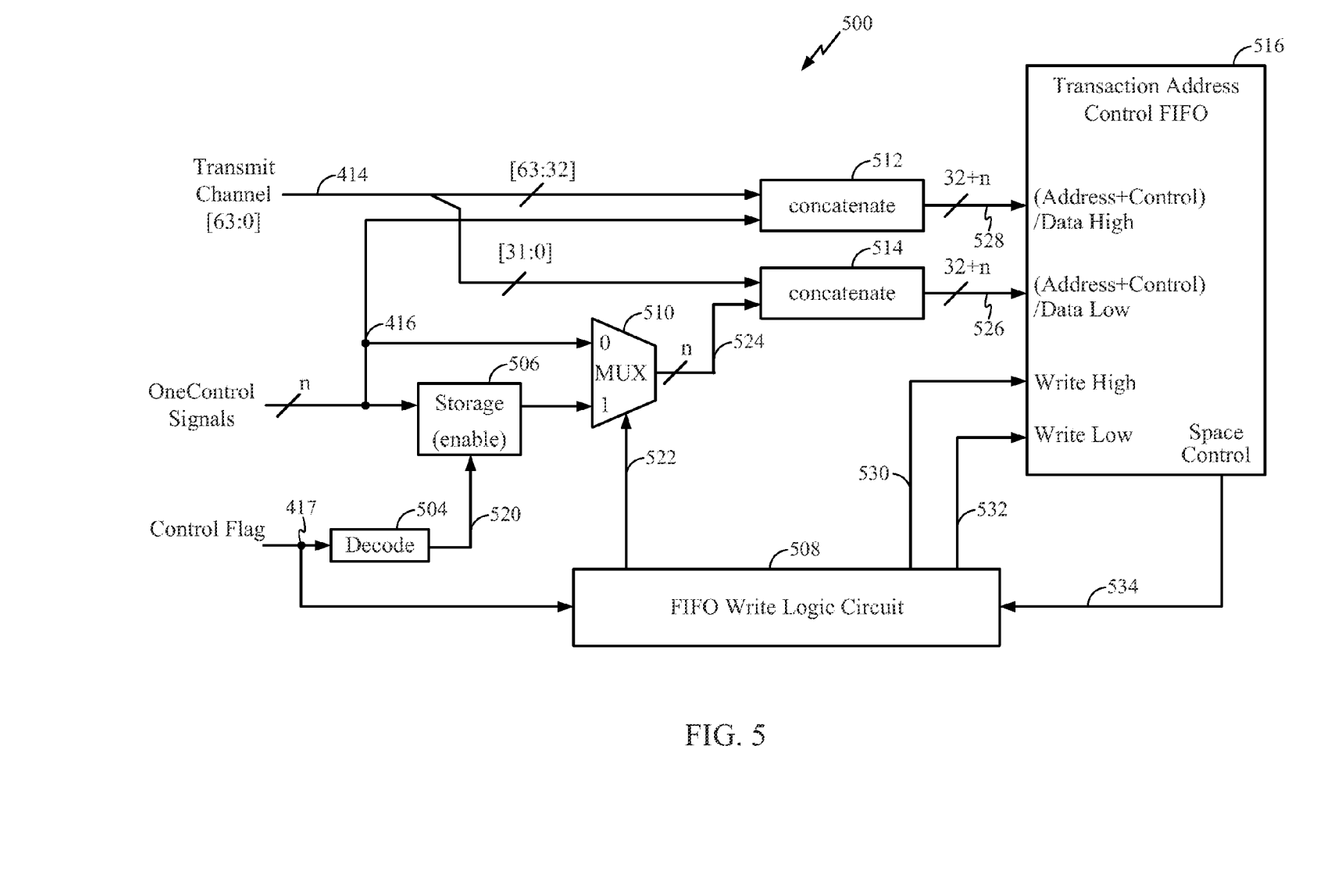
FIG. 5 illustrates an exemplary slave controller circuit for a transmit channel, one control signals, and control flag operations in accordance with the present invention.

FIG. 5 illustrates an exemplary slave controller circuit 500 for a transmit channel, one control signals, and control flag operations in accordance with the present invention. The exemplary slave controller circuit 500 is part of the bus interface of a slave device, such as bus interface 209$_K$ of slave device 208$_K$ of FIG. 2 and includes a decoder 504, a storage circuit 506, a first in first out (FIFO) write logic circuit 508, a multiplexer (MUX) 510, concatenate circuits 512 and 514, and a transaction address control FIFO 516. Operation of the slave controller circuit 500 is described with reference to the read and write transactions on the two channel bus 402 of FIG. 4A between the bus master 204$_2$, and the slave device 208$_K$ of FIG. 2.

Beginning at "n−1" cycle 405, the bus interface 205$_2$ as directed by the bus master 204$_2$ issues control information C$_{A2}$ on the one control signals 416 and a value of "0010" on the control flag 417. The control flag value "0010" indicates that the control signals presented in the "n−1" cycle 405 are for the address A2 presented in the "n" cycle 406. The write address A2 (W$_{A2}$) is a 32-bit write address that is issued, for example, on bits [31:0] of the 64-bit transmit channel 414 in the "n" cycle 406. At "n−1" cycle 405, the control flag 417 is decoded in decoder 504 which generates an enable signal 520 to store the values on the one control signals 416 in the storage circuit 506. The control flag 417 is also stored in the FIFO write logic circuit 508.

At "n" cycle 406, the bus master 204$_2$ issues control information C$_{A1}$ on the one control signals 416 and a value of "1101" on the control flag 417. The control flag value "1101" indicates that the control signals presented in the "n" cycle 406 are associated with the address A1 also presented in the "n" cycle 406. The read address A1 (R$_{A1}$) is a 32-bit read address that is issued, for example, on bits [63:32] of the 64-bit transmit channel 414 in the "n" cycle 406. At "n" cycle 406, the control flag 417 is decoded in decoder 504, but in this case does not generate an enable signal 520 for the storage circuit 506. The control flag 417 is also stored in the FIFO write logic circuit 508.

Also, at the "n" cycle 406, the FIFO write logic circuit 508 generates a MUX low address enable signal 522 which causes the MUX 510 to select the one control signals values stored from the "n−1" cycle 405 and pass these stored values 524 to the concatenate circuit 514. The concatenate circuit 514 combines the write address A2 issued on bits [31:0] of the 64-bit transmit channel 414 with the stored control information C$_{A2}$ on stored values 524 on the 32+n bit concatenate low bus 526. The concatenate circuit 512 combines the read address A1 issued on bits [63:32] of the 64-bit transmit channel 414 with the current control information C$_{A1}$ on the one control signals 416 on the 32+n bit concatenate high bus 528.

Further, during the "n" cycle 406, the FIFO write logic circuit 508 generates a write high signal 530 and a write low signal 532 to the transaction address control FIFO circuit 516 for storing and controlling the data transactions received on the transmit channel 414. Transactions of two channel bus to slave device 208$_K$ may be throttled by space control signal 534 generated by the transaction address control FIFO 516. The space control signal 534 indicates whether memory space is available in the transaction address control FIFO 516 to store additional data transactions. If memory space is not available, data transactions may be paused pending the availability of memory space. With the control flag 417 having a "0000" value in cycles "n+1" through "n+4" while data is transmitted on the transmit channel 414, the slave controller circuit 500 enters and stays in an idle state for responding to the one control signals 416 until the control flag 417 indicates control information is present on the one control signals 416.

Figure 6:
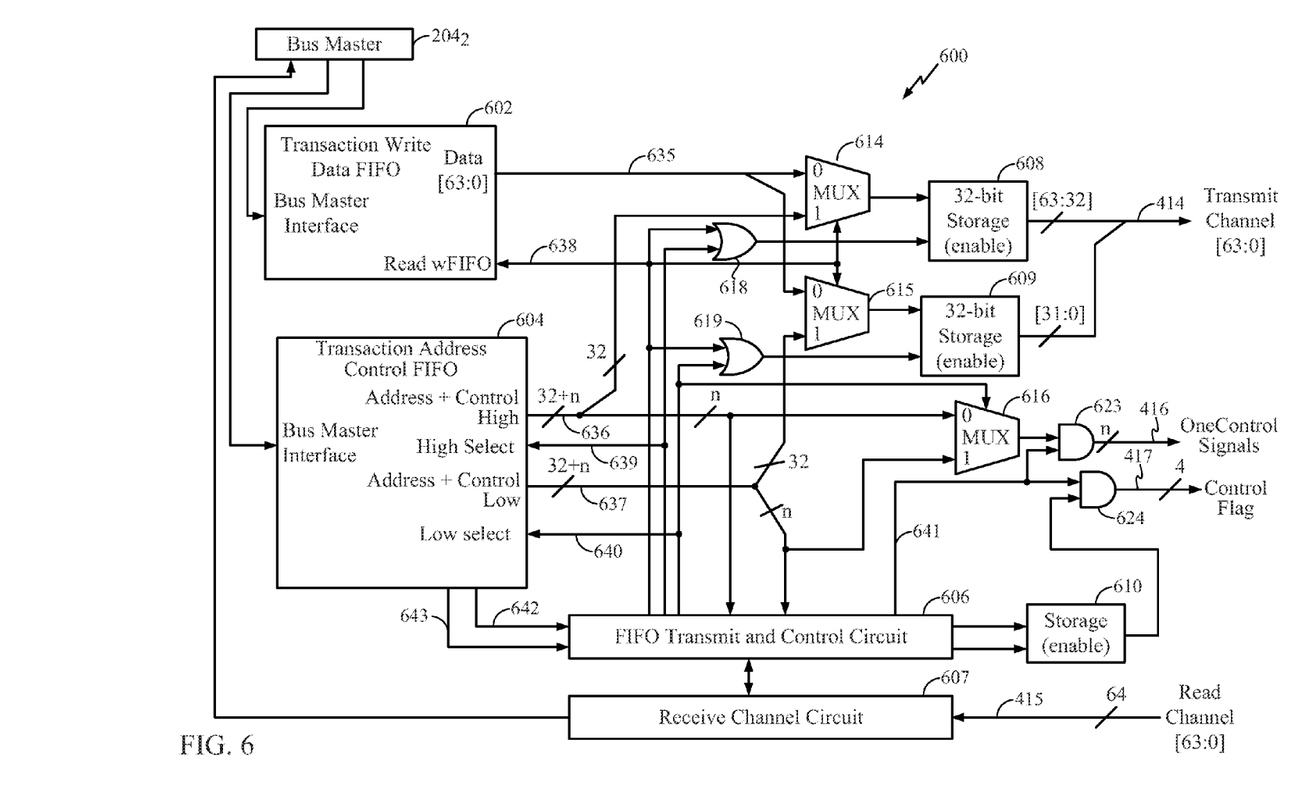
FIG. 6 illustrates an exemplary master controller circuit for a transmit channel, one control signals, and control flag operations in accordance with the present invention.

FIG. 6 illustrates an exemplary master controller circuit 600 for a transmit channel, one control signals, and control flag operations in accordance with the present invention. The exemplary master controller circuit 600 is part of the bus interface of a bus master, such as bus interface 205$_2$ of bus master 204$_2$ of FIG. 2. The master controller circuit 600 includes a channel data bus circuit having a transaction write data FIFO 602, multiplexers (MUXs) 614 and 615, storage circuits 608 and 609, and a receive channel circuit 607. The master controller circuit 600 also includes a control circuit having a transaction address control FIFO 604, a FIFO transmit and control circuit 606, storage circuit 610, multiplexer 616, logic NOR circuits 618 and 619, and logic AND circuits 623 and 624. Operation of the master controller circuit 600 is described with reference to the read and write transactions on the two channel bus 402 of FIG. 4A between the bus master 204$_2$, and the slave device 208$_K$ of FIG. 2.

Prior to the "n−1" cycle 405, the bus master 204$_2$ loads write data for a four data packet transmission in the transaction write data FIFO 602. The bus master 204$_2$ also loads address and control information in the transaction address control FIFO 604 for both the four data packet transmission and for a four data packet receive operation. The setup operations cause a data available signal 642 and an address available signal 643 to be generated to the FIFO transmit and control circuit 606 to indicate a transaction operation is pending.

At the "n−1" cycle 405, the FIFO transmit and control circuit 606, after receiving indication of a pending transaction operation, asserts a low select signal 640 to fetch the write address W$_{A2}$ and control information C$_{A2}$ from the transaction address control FIFO 604. For this scenario, the FIFO transmit and control circuit 606 may also assert a high select signal 639 to fetch the read address R$_{A1}$ and control information C$_{A1}$ from the transaction address control FIFO 604. An AND control signal 641 is asserted to enable the AND gates 623 and 624. The Mux 616 receives the asserted low select signal 640 which enables the Mux 616 to select the control information C$_{A2}$ to be issued on the one control signals 416. Also, a value of "0010" is issued on the control flag 417 as selected from the storage circuit 610. The control flag value "0010" indicates that the control signals presented in the "n−1" cycle 405 are for the address W$_{A2}$ to be presented in the "n" cycle 406. The write address A2 (W$_{A2}$) is a 32-bit write address that is issued, for example, on bits [31:0] of the 64-bit transmit channel 414 in the "n" cycle 406. Since the transmit channel 414 is potentially active and completing a previous operation in the "n−1" cycle 405, the addresses W$_{A2}$ and R$_{A1}$ are stored for use in the next cycle. For example, with a transmit write FIFO signal 638 in a non asserted state, the multiplexers Mux 614 and 615 are enabled to select address information from the transaction address control FIFO 604. The addresses R$_{A1}$ and W$_{A2}$ are stored in the 32-bit storage circuits 608 and 609, respectively, by the end of the "n−1" cycle 405 or at the start of the "n" cycle 406 using a clock edge, for example.

At "n" cycle 406, the control information C$_{A1}$ is issued on the one control signals 416. The AND control signal 641 is asserted to enable AND gates 623 and 624. The low select signal 640 is deasserted causing the MUX 616 to select the control information C$_{A1}$ and a value of "1101" is issued on the control flag 417 from the storage circuit 610. The control flag value "1101" indicates that the control signals presented in the "n" cycle 406 are associated with the address R$_{A1}$ also presented in the "n" cycle 406. The read address R$_{A1}$ is a 32-bit read address that is issued, for example, on bits [63:32] of the 64-bit transmit channel 414 in the "n" cycle 406. The write address W$_{A2}$ is a 32-bit write address that is issued, for example, on bits [31:0] of the 64-bit transmit channel 414 in the "n" cycle 406. The transmit write FIFO signal 638 is asserted causing 64 bits of data to be read from the transaction write data FIFO 602 and selected by Mux's 614 and 615. The Mux's 614 and 615 output data is stored in 32-bit storage circuits 608 and 609, respectively, by the end of the "n" cycle 406 or at the start of the "n+1" cycle 407 using a clock edge, for example.

At cycle "n+1" 407, the AND control signal 641 is deasserted at AND gates 623 and 624 causing all zero's to be issued on the one control signals 416 so that no transition causes unnecessary power use and "0000" is issued on the control flag 417. The first 64-bit write data packet $WD0_{42}$ is issued on the transmit channel 414. The first 64-bit read data packet $RD0_{41}$ is received in receive channel circuit 607 from the read channel 415. With the control flag 417 having a "0000" value in cycles "n+1" through "n+4" while data is transmitted on the transmit channel 414, the master controller circuit 600 for controlling the one control signals 416 enters and stays in an idle state until the bus master $204_2$ initiates new control information for another bus operation.

The methods described in connection with the embodiments disclosed herein may be embodied in a combination of hardware and in a software module storing non-transitory signals executed by a processor. The software module may reside in random access memory (RAM), flash memory, read only memory (ROM), electrically programmable read only memory (EPROM), hard disk, a removable disk, tape, compact disk read only memory (CD-ROM), or any other form of storage medium known in the art. A storage medium may be coupled to the processor such that the processor can read information from, and in some cases write information to, the storage medium. The storage medium coupling to the processor may be a direct coupling integral to a circuit implementation or may utilize one or more interfaces, supporting direct accesses or data streaming using down loading techniques.

While the invention is disclosed in the context of illustrative embodiments for use in processor systems it will be recognized that a wide variety of implementations may be employed by persons of ordinary skill in the art consistent with the above discussion and the claims which follow below. The present technique is scalable. For example, with a transmit channel of 128 bits supporting 128 bit write data and 32-bit addresses, up to four transaction addresses may be issued on the transmit channel in a single cycle. In this case, the control flags may be issued in cycles "n−3", "n−2", and "n−1", which is three cycles prior to the "n" address phase, where the fourth control flag would be issued. In each of the transmit channel cycles proceeding the "n" address phase, the transmit channel is either a NOP or completing a previous write data transmission and the one control signals may be used to issue control information for each of the four transactions.

What is claimed is:

1. A method of providing control information on a multi-channel bus, the method comprising:

issuing in a second clock cycle two address values on a transmit channel of the multi-channel bus for two data transactions on the multi-channel bus;

issuing in a first clock cycle, where the first clock cycle immediately precedes the second clock cycle, a first set of control information on a one control signals of the multi-channel bus, the first set of control information comprising a first control flag to indicate that the first set of control information is for a first of the two data transactions; and issuing in the second clock cycle a second set of control information on the one control signals of the multi-channel bus, the second set of control information comprising a second control flag to indicate that the second set of control information is for a second of the two data transactions.

2. The method of claim 1, wherein the multi-channel bus further comprises:

a read channel.

3. The method of claim 1, further comprising:

issuing in the first clock cycle the two address values and the control information; and transferring data in one or more additional cycles beginning with the two data transactions.

4. The method of claim 3, wherein each of the two data transactions have the same control information indicated by the first control flag.

5. The method of claim 1, wherein each of the two data transactions have different control information each indicated by a unique control flag.

6. The method of claim 1, wherein the first set of control information includes an attribute that indicates a no operation (NOP) or a write data phase of the multi-channel bus.

7. The method of claim 1, further comprising:

issuing during a third clock cycle a second set of two address values on the transmit channel of the multi-channel bus for a second set of two data transactions on the multi-channel bus; and issuing in the third clock cycle a third set of control information on the one control signals of the multi-channel bus, the third set of control information comprising a third control flag to indicate that the third set of control information is for second set of two data transactions.

8. A multi-channel bus comprising:

a read channel;

a one control signals;

a transmit channel; and a bus interface to:

issue during a second clock cycle two address values on the transmit channel of the multi-channel bus for two data transactions on the multi-channel bus;

issue in a first clock cycle, where the first clock cycle immediately precedes the second clock cycle, a first set of control information on the one control signals of the multi-channel bus, the first set of control information comprising a first control flag to indicate that the first set of control information is for a first of the two data transactions; and issue in the second clock cycle a second set of control information on the one control signals of the multi-channel bus, the second set of control information comprising a second control flag to indicate that the second set of control information is for a second of the two data transactions.

9. The multi-channel bus of claim 8, further comprising a controller for determining:

an attribute describing the first set of control information and a transaction cycle to indicate the attribute; and associated control information for the two or more data transactions.

* * * * *